United States Patent

Shalvi

[19]

[11] Patent Number: 6,120,165
[45] Date of Patent: Sep. 19, 2000

[54] OUTDOOR SOLAR LAMP

[75] Inventor: Ram Shalvi, Ramat-Hasharon, Israel

[73] Assignee: Solar Wide Industrial Ltd., The Hong Kong Special Administrative Region of the People's Republic of China

[21] Appl. No.: 09/214,560
[22] PCT Filed: Jul. 9, 1997
[86] PCT No.: PCT/GB97/01845
  § 371 Date: Jun. 3, 1999
  § 102(e) Date: Jun. 3, 1999
[87] PCT Pub. No.: WO98/01699
  PCT Pub. Date: Jan. 15, 1998

[30] Foreign Application Priority Data

Jul. 10, 1996 [GB] United Kingdom ................. 96146402

[51] Int. Cl.[7] ............................. F21L 4/02; F21V 23/00
[52] U.S. Cl. ..................... 362/276; 362/183; 362/802; 315/149
[58] Field of Search ................... 315/149, 155, 315/156; 340/565, 567; 362/183, 276, 802, 184, 20

[56] References Cited

U.S. PATENT DOCUMENTS

| | | | |
|---|---|---|---|
| 4,841,416 | 6/1989 | Doss | 362/183 |
| 4,890,093 | 12/1989 | Allison et al. | 362/431 |
| 4,982,176 | 1/1991 | Schwarz | 340/567 |
| 5,145,247 | 9/1992 | Mandy | 362/148 |
| 5,155,474 | 10/1992 | Park et al. | 340/567 |
| 5,217,296 | 6/1993 | Tanner et al. | 362/183 |
| 5,477,212 | 12/1995 | Rumpel | 340/567 |
| 5,713,655 | 2/1998 | Blackman | 362/20 |

FOREIGN PATENT DOCUMENTS 3735217  4/1989  Germany .

*Primary Examiner*—Alan Cariaso
*Attorney, Agent, or Firm*—Jackson Walker L.L.P.

[57] ABSTRACT

An outdoor solar lamp has a stand (10), with a foot (11), that supports a solar cell panel (12) in a housing (13). A passive infrared motion detector (14) is mounted in a peripheral surface of the housing (13). Incandescent lamps and a halogen lamp (not shown) are supported behind diffusers (15 and 16) respectively. The incandescent lamps operate automatically to be turned ON and OFF as required in a generally known manner. The halogen lamp is provided for security and is controlled to be turned ON when motion is sensed by the detector (14) to illuminate and indicate the presence of an intruder. A security mode of the halogen lamp is armed and disarmed remotely, using a handheld infrared transmitter.

2 Claims, 3 Drawing Sheets

OUTDOOR SOLAR LAMP

The invention relates to outdoor solar lamps.

Solar lamps are already known which have a battery that is charged up during daylight hours by solar radiation and which provide light at night in gardens and open spaces when required. Generally, the lamp output is of relative low intensity and incandescent lamps are used (see U.S. Pat. No. 4,982,176). This may be quite satisfactory for normal illumination but when illumination output is required to be significantly greater, for security purposes for example, the presently used lamps are not satisfactory.

It is an object of the invention to overcome or at least reduce this problem.

According to the invention there is provided an outdoor solar lamp having a rechargeable battery, a solar panel, a halogen lamp, a lamp drive circuit, and a passive infra-red motion detector, in which the lamp is supplied with power via the drive circuit when the motion detector is initiated.

The lamp may include one or more illuminating incandescent or light emitting diode lamps and an automatic control circuit to supply power from the battery to the lamps during at least part of each night.

Where two or more illuminating lamps are used they are preferably electrically connected in series, each lamp having a parallel circuit through which current can automatically pass if the lamp fails and goes open-circuit.

The drive circuit may be arranged to supply automatically a low power to the halogen lamp during at least part of each night such that the halogen lamp glows to provide a relatively low intensity output.

The lamp preferably includes an arming and dis-arming circuit that responds to external stimuli, such as infra-red, ultrasonic or radio signals.

An outdoor solar lamp according to the invention will now be described by way of example with reference to the accompanying drawings in which.

Figure 1:
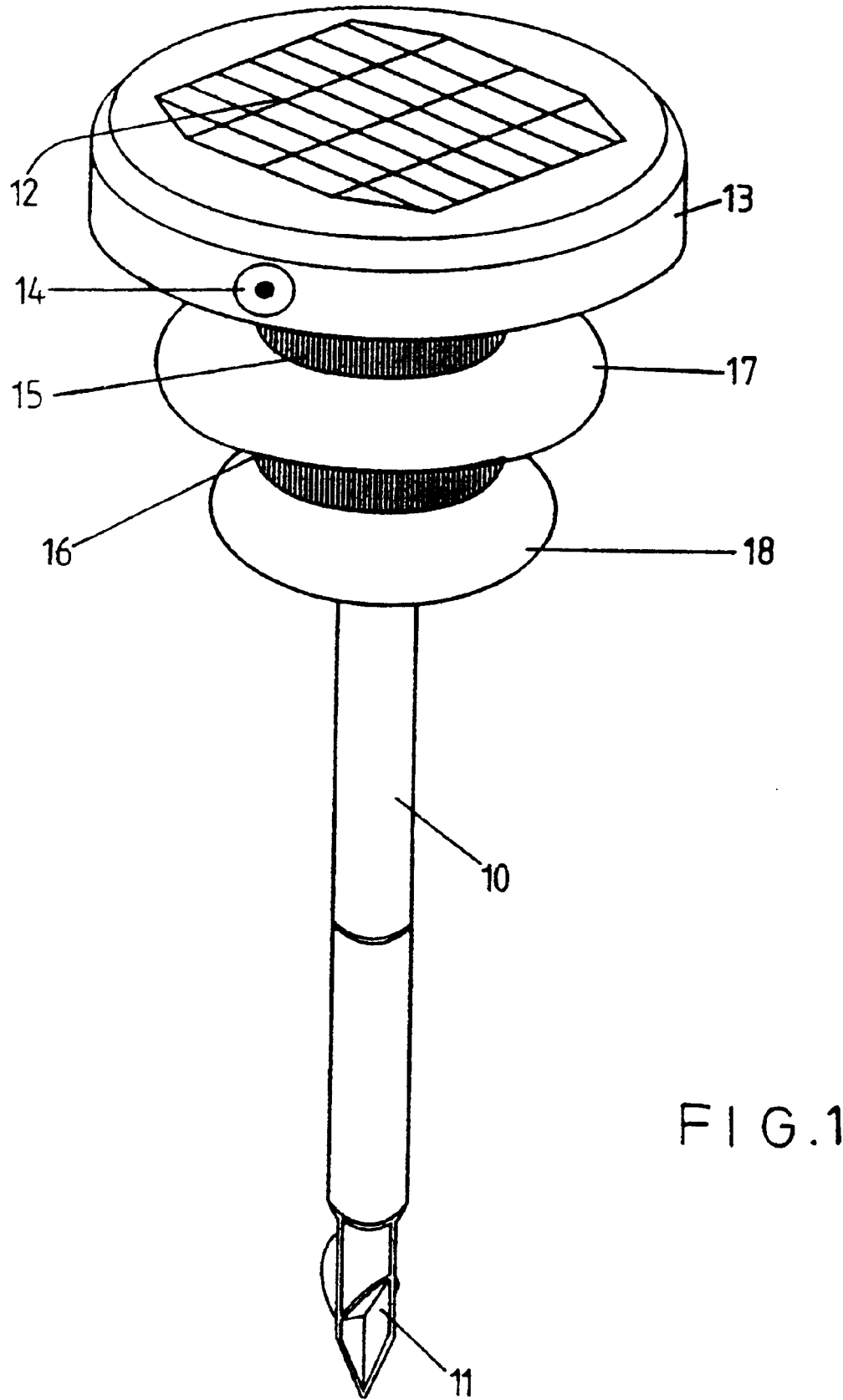
FIG. 1 is an isometric view of the lamp.

Referring to the drawings, in FIG. 1 the lamp comprises a stand 10 having a pointed foot 11 that can be poked into the ground or otherwise held by grouting or the like in position. A solar cell panel 12 is mounted in a housing 13 at the top of the stand 10 and a passive infra-red detector 14 is mounted in a peripheral surface of the housing 13. Circular protective light diffusers 15 and 16 are supported above respective shades 17 and 18 fitted to the stand 10. Three illuminating low intensity incandescent lamps and a halogen lamp, described below, are supported behind the diffusers 15 and 16 respectively. Light emitting diode lamps with built-in diffusers may also be used instead of the incandescent lamps.

In normal use, the incandescent lamps are illuminated automatically during at least some of each night by power derived from a battery (not shown) inside the housing 13 in a manner generally known already. The halogen lamp is however arranged to be illuminated whenever motion is detected in a region adjacent the solar lamp by the detector 14 to provide a comparatively bright illumination. This bright illumination is normally or primarily used for security purposes to alert a householder of the proximate presence of a possibly unwelcome intruder. The operation of the detector 14 is controlled by an arming circuit, as will be described below, so that the intruder detecting part of the lamp can be remotely controlled, by selected infra-red signals for example.

Figure 2:
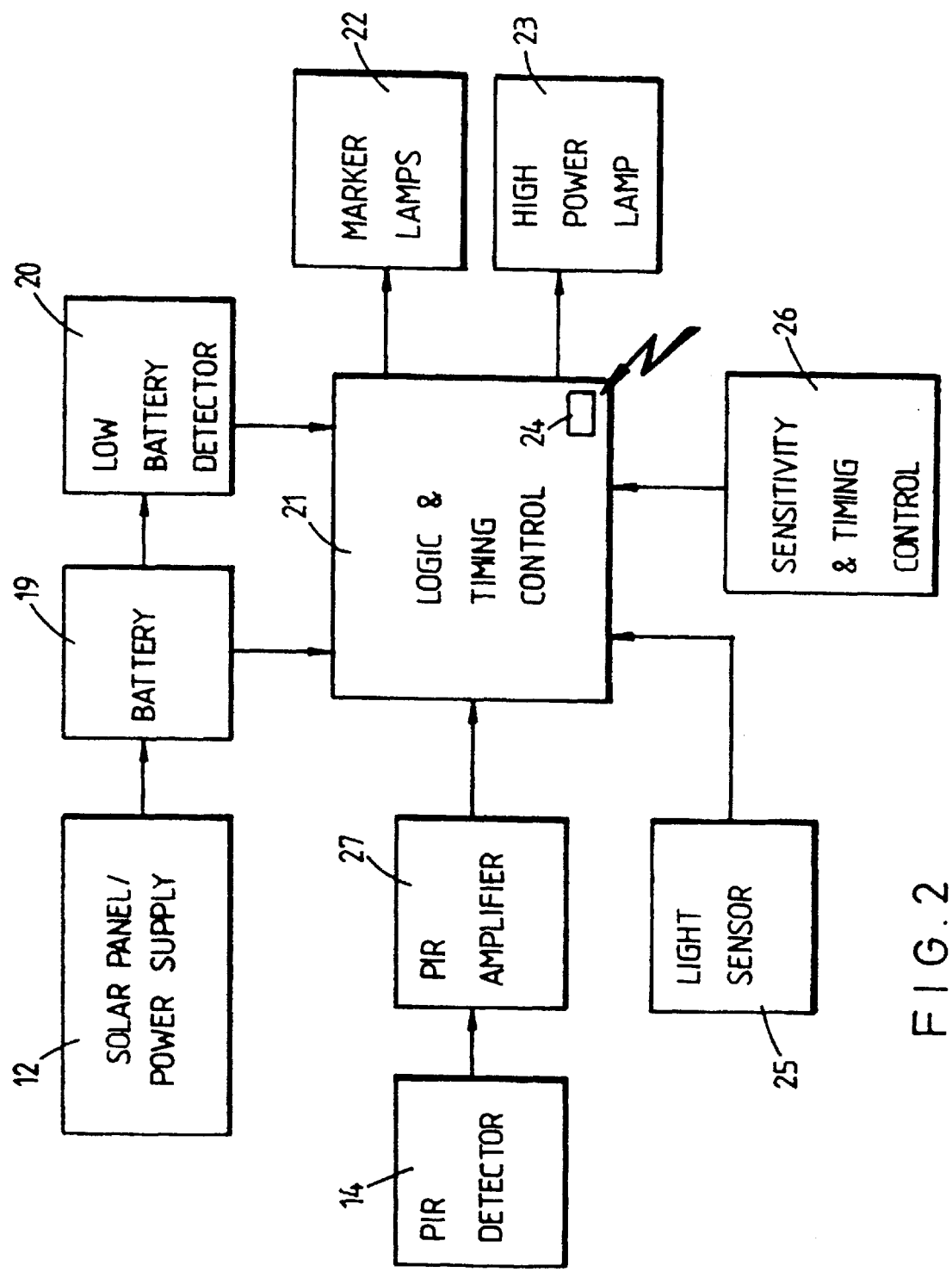
FIG. 2 is a schematic diagram for the lamp.

In FIG. 2, the lamp includes a battery 19 and low battery voltage detector circuit 20 connected to a logic and timing control circuit 21 that controls the operation of incandescent lamps 22 and a halogen lamp 23. The logic and timing control circuit 21 includes an infra-red sensor 24 that responds to selected external infra-red signals and supplies signals to the circuit 21 to arm and dis-arm the solar lamp, as will be explained below. An ambient light intensity sensor 25 and a sensitivity and timing circuit 26 also supplies signals to the circuit 21. The passive infra-red detector 14 supplies signals via a passive infra-red amplifier 27 (which in practice consists of a preamplifier and an amplifier), which are monitored by the circuit 26, as seen later in FIG. 3, for application via a comparator 27A to the circuit 21.

In operation, as will also be further explained below, the solar lamp is arranged so that during certain selected and relevant times, and according to the ambient light intensity, the battery 19 is charged up and the lamps 22 are turned ON and OFF automatically. Should the voltage of the battery 19 fall below a predetermined threshold, which is detected by the circuit 20, the lamps 22 will be automatically turned OFF, even during the night, to prevent damage to the battery 19 due to being otherwise discharged too much.

Figure 3:
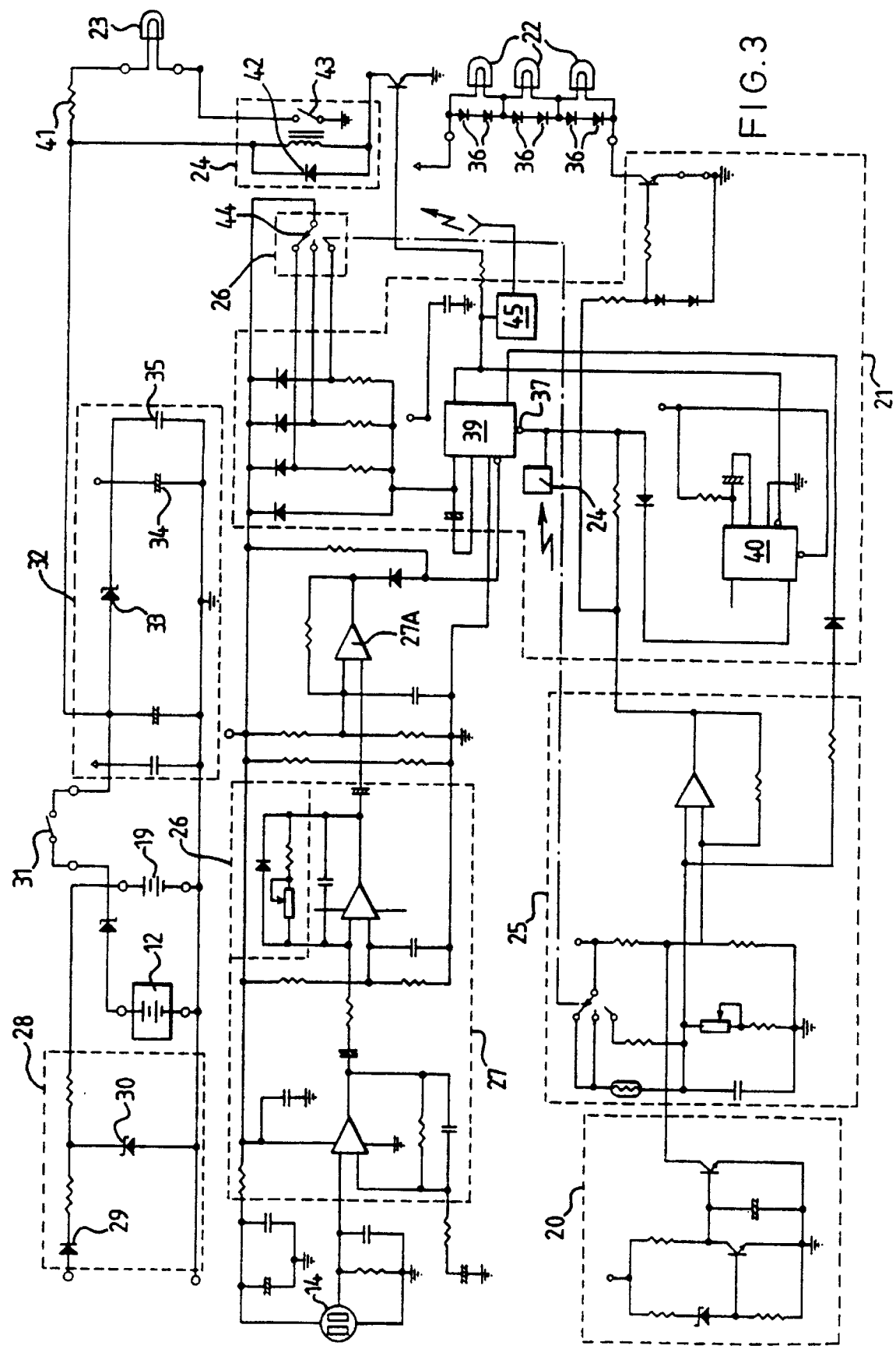
FIG. 3 is a circuit diagram for the lamp.

In FIG. 3, blocks are provided in dotted outline and numbered with numerals which correspond to the components of FIG. 2 for ease of reference. In addition, the circuit in FIG. 3 includes a charging circuit 28 including a diode 29 and zener diode 30 to allow the battery 19 to be charged up from a separate mains supply. This may be needed initially and from time to time during winter periods or during periods when the weather is poor. A power switch 31 is used to connect the battery 19 to the rest of the circuit. The main switch 31 is normally hidden or not immediately accessible from outside the housing 13 to prevent switching ON and OFF by an unauthorised person.

A lamp drive circuit 32 receives power from the battery 19, via the switch 31, and supplies power separately to three incandescent lamps 22 and to the halogen lamp 23. The circuit 32 also supplies power to the other circuits, via connection Vcc. The output voltage at Vcc is regulated by a blocking diode 33 and a filter comprising diodes 34 and 35.

It will be noted that diodes 36 are connected in pairs in parallel with each of the lamps 22. In practice, the overall voltage supplied across the three lamps 22 is set at approximately 6 volts and the voltage drop across each lamp is 1.5 volts. Each diode 36 will automatically conduct current if the applied voltage is above a threshold of 0.8 volts, that is above 1.6 volts for each pair of diodes. This means that if any one of the three incandescent lamps 22 fails, which normally means going open-circuit, the threshold voltage across the respective pair of diodes of that lamp will be exceeded and current will therefore then flow, via the respective pair of diodes, to the other lamps. In other words, the described diodes 36 enable the lamps 22 to remain ON even if one or two of the three lamps fail.

The detector 24 is connected to a pin 38 of a microprocessor 39 in a part of the logic and timing circuit 21. The micro-processor 39 controls the operation of the halogen lamp 23. As such, the user of the solar lamp can control this operation using a suitable handheld infra-red transmitter for example. The main purpose of the lamp 23 is for security and so the lamp 23 is arranged to be turned ON in the presence of any body movements in the region of the solar lamp. Use and the general characteristics of infra-red motion sensors such as the detector 14 incorporated in the solar lamp are generally known per se. In this application, the user can however prepare the described circuit for the operation of the halogen lamp 22, that is the user can "arm" the solar lamp (or circuit 21), by using a handheld transmitter. The solar lamp is also arranged to be "dis-armed" using the same transmitter. The solar lamp can therefore be conveniently and remotely armed and dis-armed when the user is normally out of range of movement detection himself by the passive infra-red detector 14. More importantly, any intruder is unable to dis-arm or turn off the solar lamp by operating the switch 31, or some other manual switch on the solar lamp.

It is also possible to arrange for the lamps 23 to be remotely controlled by providing a second detector. The second detector responds to infra-red signals at different frequencies to the signals used by the detector 24 and the micro-processor 39. The second detector provides input signals to a micro-processor 40 in a part of the circuit 21 that controls the operation of the lamps 23.

A current damping resistor 41 and clamping diode 42 are provided to reduce any surges at turn ON of the halogen lamp 23 by the relay 43.

A manually operable mode selection switch 44 is also provided to set the time period for which the halogen lamp 23 turns ON each time any motion is detected by the detector 14. Provision is made for time periods of 60 seconds, 30 seconds and a test period of 10 seconds. The switch 44 might be used only during initial testing and assembly of the solar lamp circuit and then set, in the factory say, at either 60 seconds or 30 seconds, as required.

An optional radio transmitter 45 is connected to a pin of the micro-processor 39. The transmitter 45 is turned ON automatically whenever the lamp 23 is turned ON. Typically, the transmitter produces a short range transmission that can be picked by a nearby radio receiver in an adjacent house or building. Such a transmission will alert the house occupant, or trigger some overall security system for example, indicating that motion has been detected in the region of the solar lamp which will normally need further investigation.

The halogen lamp 23 is capable of operating to provide a low intensity light output, this is achieved by supplying power intermittently to the lamp 23, in a manner well-known in common dimmer supply circuit arrangements for example. As such the lamp 23 can be used in such a mode as an illuminating low intensity lamp in addition or as an alternative to the lamps 22.

What is claimed is:

1. An outdoor solar lamp comprising:

a rechargeable battery electrically connected to a solar panel;

a lamp electrically connected to a lamp drive circuit;

a passive infra-red motion detector, in which said lamp is supplied with power via said drive circuit when said motion detector is initiated, said lamp being a halogen lamp;

one or more illuminating lamps that are not initiated by said motion detector;

an automatic control circuit to supply power from said battery to said illuminating lamps during at least part of each night wherein one or more of said illuminating lamps are light emitting diodes; and two or more of said illuminating lamps are electrically connected in series, each said illuminating lamp having a parallel circuit through which current can automatically pass if any of said illuminating lamps fail and go open circuit.

2. An outdoor solar lamp comprising:

a rechargeable battery electrically connected to a solar panel;

a lamp electrically connected to a lamp drive circuit;

a passive infra-red motion detector, in which said lamp is supplied with power via said drive circuit when said motion detector is initiated, said lamp being a halogen lamp;

one or more illuminating lamps that are not initiated by said motion detector;

an automatic control circuit to supply power from said battery to said illuminating lamps during at least part of each night wherein said illuminating lamps are incandescent lamps; and two or more of said illuminating lamps are electrically connected in series, each said illuminating lamp having a parallel circuit through which current can automatically pass if any of said illuminating lamps fail and go open circuit.

* * * * *